(12) United States Patent
Rieth et al.

(10) Patent No.: US 10,706,474 B2
(45) Date of Patent: Jul. 7, 2020

(54) SUPPLEMENTAL REVIEW PROCESS DETERMINATION UTILIZING ADVANCED ANALYTICS DECISION MAKING MODEL

(71) Applicant: HARTFORD FIRE INSURANCE COMPANY, Hartford, CT (US)

(72) Inventors: Kimberly A. Rieth, Woodgate, NY (US); Lucas Raymond Roberts, New York, NY (US); Christopher L. Sheaffer, New Hartford, NY (US)

(73) Assignee: Hartford Fire Insurance Company, Hartford, CT (US)

( * ) Notice: Subject to any disclaimer, the term of this patent is extended or adjusted under 35 U.S.C. 154(b) by 599 days.

(21) Appl. No.: 15/137,667

(22) Filed: Apr. 25, 2016

(65) Prior Publication Data

US 2017/0308958 A1 Oct. 26, 2017

(51) Int. Cl.
*G06Q 40/08* (2012.01)

(52) U.S. Cl.
CPC .................................. *G06Q 40/08* (2013.01)

(58) Field of Classification Search
None
See application file for complete search history.

(56) References Cited

U.S. PATENT DOCUMENTS

| | | |
|---|---|---|
| 8,275,707 B1 | 9/2012 | Boyd |
| 8,463,699 B2 | 6/2013 | Karlinski, III et al. |
| 8,655,687 B2 | 2/2014 | Zizzamia et al. |
| 8,793,146 B2 | 7/2014 | Bonissone et al. |

(Continued)

FOREIGN PATENT DOCUMENTS

WO WO-2008/079325 * 12/2007

OTHER PUBLICATIONS

"Introduction to Logistic Regression" by by Karen Grace-Martin found in the Internet Archive (aka, the Wayback Machine) at https://www.theanalysisfactor.com/introduction-to-logistic-regression/ , dated Apr. 22, 2012.*

(Continued)

*Primary Examiner* — Alexander G Kalinowski
*Assistant Examiner* — Blane A Lickteig
(74) *Attorney, Agent, or Firm* — Howard IP Law Group, PC

(57) ABSTRACT

A system may automatically identify electronic records to be routed to a supplemental review process via an automated back-end application computer server. The system may include a data store containing electronic records, each electronic record representing a potential new risk association with an entity, and each electronic record may contain a record identifier and a set of record characteristic values. The computer server may then access the electronic records and automatically generate, by an advanced analytics decision making model based on the record characteristic values, a supplemental review process indication for the potential new risk association of each entity. Indications representing the supplemental review process indications may be transmitted in connection with an interactive user interface display and it may be arranged for electronic records having supplemental review process indications that meet a predetermined condition to be automatically routed such that those electronic records will undergo the supplemental review process.

15 Claims, 12 Drawing Sheets

(56) References Cited

U.S. PATENT DOCUMENTS

| | | | |
|---|---|---|---|
| 10,360,387 B2* | 7/2019 | Jou | G06N 7/005 |
| 2006/0100912 A1 | 5/2006 | Kumar et al. | |
| 2008/0154651 A1* | 6/2008 | Kenefick | G06Q 40/08 |
| | | | 705/4 |
| 2012/0303389 A1* | 11/2012 | Friedman | G06Q 10/10 |
| | | | 705/4 |
| 2014/0278588 A1* | 9/2014 | Burgoon, Jr. | G06Q 40/08 |
| | | | 705/4 |
| 2015/0025917 A1 | 1/2015 | Stempora | |
| 2015/0187011 A1 | 7/2015 | Purandare et al. | |
| 2015/0287143 A1 | 10/2015 | Gabriel et al. | |
| 2016/0012541 A1 | 1/2016 | Harrington et al. | |

OTHER PUBLICATIONS

"Introduction to Logistic Regression" by Karen Grace-Martin found in the Internet Archive (aka, the Wayback Machine) at https://www.theanalysisfactor.com/introduction-to-logistic-regression/ dated Apr. 22, 2012.*

* cited by examiner

SUPPLEMENTAL REVIEW PROCESS DETERMINATION UTILIZING ADVANCED ANALYTICS DECISION MAKING MODEL

BACKGROUND

Electronic records, such as files and database entries, may be stored and utilized by an enterprise. Moreover, an enterprise may be interested in analyzing information about each electronic record to determine if a supplemental review process should be performed for that particular record. For example, the enterprise might want to identify which electronic records would most benefit from such a supplemental review process. Manually analyzing a batch of electronic records (e.g., each associated with a potential new risk association with a different entity) to identify which ones might most benefit from the supplemental review process, however, can be a time consuming and error prone process—especially where there are a substantial number of records to be analyzed (e.g., thousands of new electronic records might need to be analyzed each week while available resources might only allow a relatively small number of those records to be reviewed) and/or there are many factors that could potentially influence whether or not each record would benefit from the supplemental review process.

It would be desirable to provide systems and methods to automatically utilize a decision making model that generates faster, more accurate identifications of electronic records for a supplemental review process and that allows for flexibility and effectiveness when reviewing those identifications.

SUMMARY OF THE INVENTION

According to some embodiments, systems, methods, apparatus, computer program code and means automatically identify electronic records to be routed to a supplemental review process. In some embodiments, a system may automatically identify electronic records to be routed to a supplemental review process via an automated back-end application computer server. The system may include a data store containing electronic records, each electronic record representing a potential new risk association with an entity, and each electronic record may contain a record identifier and a set of record characteristic values including at least one record characteristic value representing a characteristic of the entity, at least one record characteristic value representing an original source of the electronic record, and at least one record characteristic value representing third-party data. The computer server may then access the electronic records and automatically generate, by an advanced analytics decision making model based on the set of record characteristic values, a supplemental review process indication for the potential new risk association of each entity. Indications representing the supplemental review process indications may be transmitted in connection with an interactive user interface display and it may be arranged for electronic records having supplemental review process indications that meet a pre-determined condition to be automatically routed such that those electronic records will undergo the supplemental review process.

Some embodiments comprise: means for accessing a data store containing electronic records, each electronic record representing a potential new risk association with an entity, wherein each electronic record contains a record identifier and a set of record characteristic values including at least one record characteristic value representing a characteristic of the entity, at least one record characteristic value representing an original source of the electronic record, and at least one record characteristic value representing third-party data; means for automatically generating, by the back-end application computer server executing an advanced analytics decision making model, based on the set of record characteristic values, a supplemental review process indication for the potential new risk association of each entity; means for transmitting indications representing the supplemental review process indications in connection with an interactive user interface display; and means for arranging for electronic records having supplemental review process indications that meet a pre-determined condition to be automatically routed such that those electronic records will undergo the supplemental review process.

In some embodiments, a communication device associated with a back-end application computer server exchanges information with remote devices. The information may be exchanged, for example, via public and/or proprietary communication networks.

Technical effects of some embodiments of the invention are improved and computerized ways to utilize a decision making model that generates faster, more accurate identifications of electronic records for a supplemental review process and that allows for flexibility and effectiveness when reviewing those identifications. With these and other advantages and features that will become hereinafter apparent, a more complete understanding of the nature of the invention can be obtained by referring to the following detailed description and to the drawings appended hereto.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of electronic record analysis by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third party systems, networks, and subsystems. For example, in the present invention information may be transmitted to remote devices from a back-end application server and electronic records may be routed for supplemental review as appropriate, thus improving the overall performance of the system associated with message storage requirements and/or bandwidth considerations (e.g., by reducing the number of messages that need to be transmitted via a network). Moreover, embodiments associated with automatic predictions might further improve communication network performance, user interactions, real time chat or telephone call center responsiveness (e.g., by better preparing and/or allocating representatives), etc.

Electronic records, such as files and database entries, may be stored and utilized by an enterprise. Moreover, an enterprise may be interested in analyzing information about each electronic record to determine if a supplemental review process should be performed for that particular record. For example, the enterprise might want to identify which electronic records would most benefit from such a supplemental review process. Manually analyzing a batch of electronic records to identify which ones might most benefit from the supplemental review process, however, can be a time consuming and error prone process—especially where there are a substantial number of records to be analyzed (e.g., thousands of electronic records might need to be analyzed) and/or there are many factors that could potentially influence whether or not each record would benefit from the supplemental review process.

Figure 1:
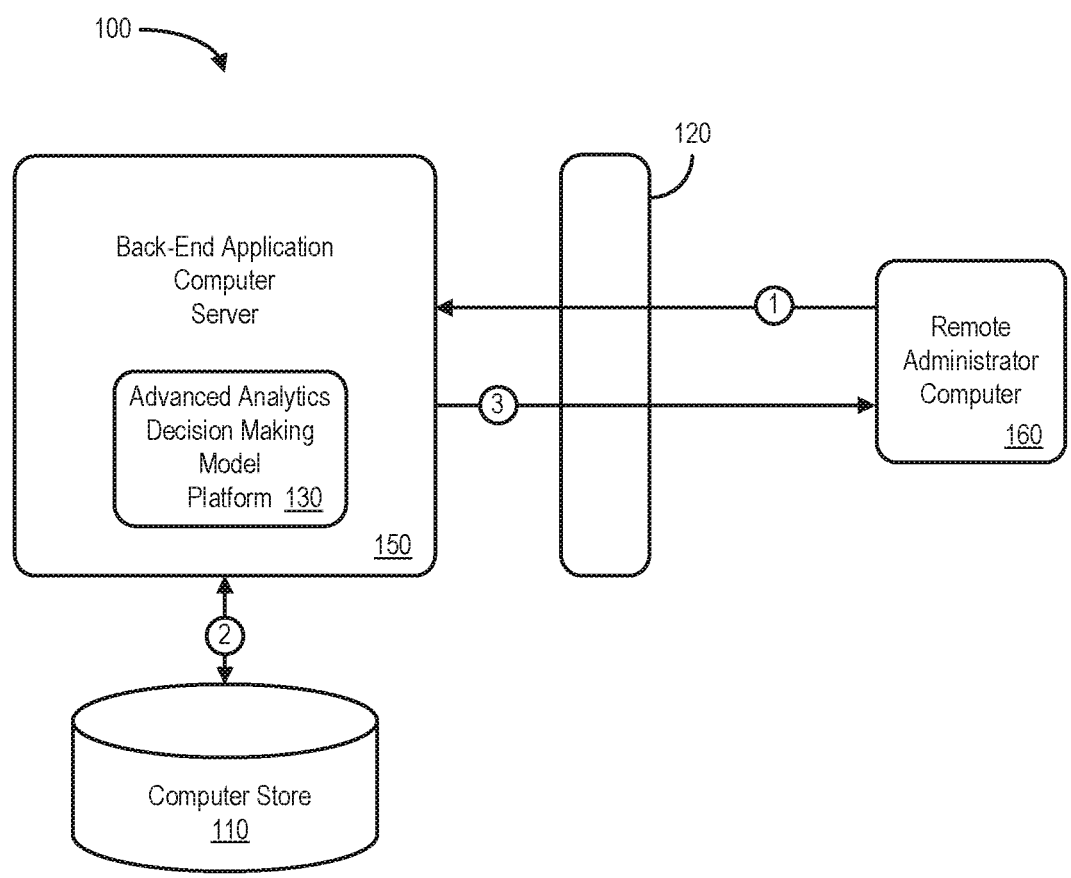
FIG. 1 is a high-level block diagram of a system according to some embodiments.

It would be desirable to provide systems and methods to utilize a decision making model that generates faster, more accurate identifications of electronic records for a supplemental review process and that allows for flexibility and effectiveness when reviewing those identifications. FIG. 1 is a high-level block diagram of a system 100 according to some embodiments of the present invention. In particular, the system 100 includes a back-end application computer server 150 that may access information in a computer store 110 (e.g., storing a set of electronic records representing potential new risk associations, each record including one or more communication addresses, attribute variables, record characteristic values, etc.). The back-end application computer server 150 may also exchange information with a remote administrator computer 160 (e.g., via a firewall 120). According to some embodiments, an advanced analytics decision making model platform 130 of the back-end application computer server 150 may recommend electronic records to be routed to a supplemental review process and the display/review of those recommendations via one or more remote administrator computers 160. Note that embodiments may be associated with periodic (or asynchronous) types of review, evaluation, and/or scheduling. Further note that the back-end application computer server 150 might be associated with a third party, such as a vendor that performs a service for an enterprise.

The back-end application computer server 150 might be, for example, associated with a Personal Computer ("PC"), laptop computer, smartphone, an enterprise server, a server farm, and/or a database or similar storage devices. According to some embodiments, an "automated" back-end application computer server 150 may automatically flag records in the computer store 110 for further evaluation or review. As used herein, the term "automated" may refer to, for example, actions that can be performed with little (or no) intervention by a human.

As used herein, devices, including those associated with the back-end application computer server 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the computer store 110. The computer store 110 might, for example, store electronic records representing potential new risk associations with entities, each electronic record being associated with a different record identifier, communication address, record characteristic values, and/or attribute variables. The computer store 110 may also contain information about past and current interactions with parties, including those associated with remote communication devices. The computer store 110 may be locally stored or reside remote from the back-end application computer server 150. As will be described further below, the computer store 110 may be used by the back-end application computer server 150 to automatically determine if a supplemental review process might be appropriate for a particular electronic record. Although a single back-end application computer server 150 is shown in FIG. 1, any number of such devices may be included. Moreover, various devices described herein might be combined according to embodiments of the present invention. For example, in some embodiments, the back-end application computer server 150 and computer store 110 might be co-located and/or may comprise a single apparatus.

According to some embodiments, the system 100 may automatically route electronic records for a supplemental review process via the automated back-end application computer server 150. For example, at (1) the remote administrator computer 160 may request that a batch of electronic records be analyzed to automatically determine which ones might most benefit from a supplemental review process. The advanced analytics decision making model platform 130 may then access information in the computer store 110 at (2) and exchange information with the administrator at (3) to support an interactive user interface display (e.g., including indications of which records should undergo the supplemental review process). The system 100 might also automatically transmit information about the flagged electronic records to the remote administrator computer 160 and/or a supplemental review process workstation or platform (not illustrated in FIG. 1).

Figure 2:
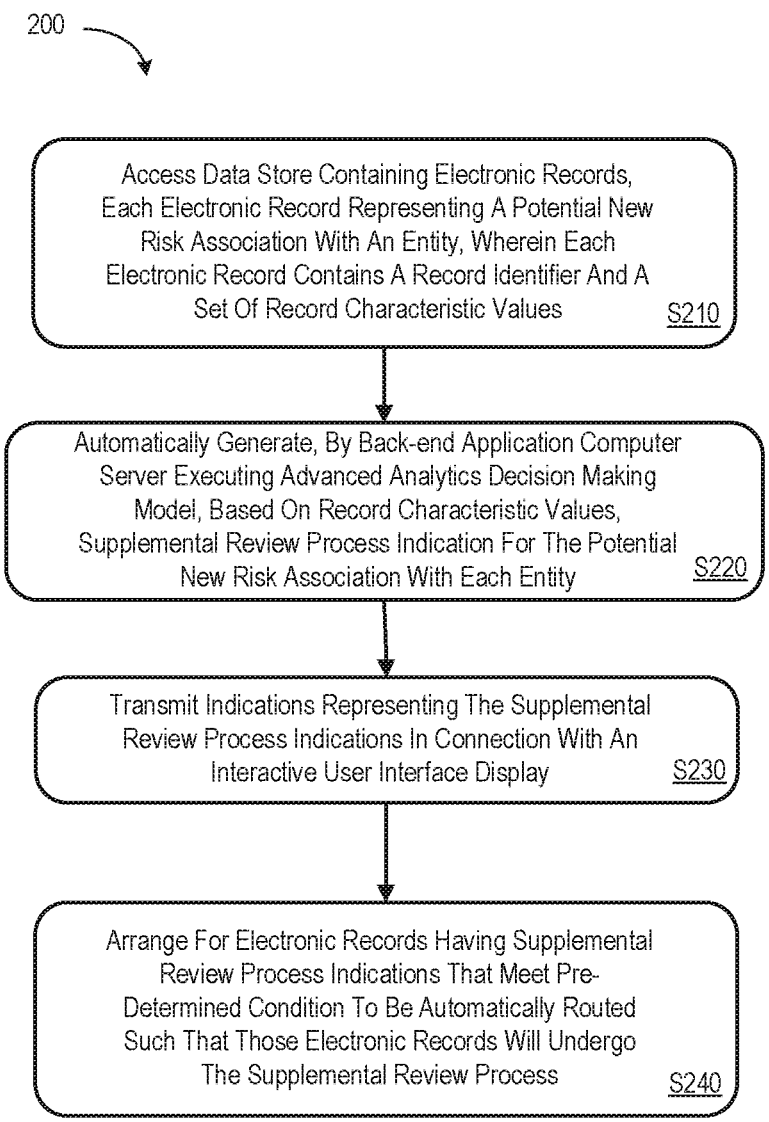
FIG. 2 illustrates a method according to some embodiments of the present invention.

Note that the system 100 of FIG. 1 is provided only as an example, and embodiments may be associated with additional elements or components. According to some embodiments, the elements of the system 100 automatically support interactive user interface displays over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, an automated back-end application computer server may access a data store containing electronic records, each electronic record representing a potential new risk association with an entity, wherein each electronic record contains a record identifier and a set of record characteristic values including at least one record characteristic value representing a characteristic of the entity, at least one record characteristic value representing an original source of the electronic record, and at least one record characteristic value representing third-party data. At S220, the system may automatically generate, by an advanced analytics decision making model based on the set of record characteristic values, a supplemental review process indication for the potential new risk association of each entity. At S230, indications representing the supplemental review process indications may be transmitted in connection with an interactive user interface display. At S240, the system may arrange for electronic records having supplemental review process indications that meet a pre-determined condition to be automatically routed such that those electronic records will undergo the supplemental review process.

As used herein, a "decision making" model may be associated with an approach that utilizes statistics and analytics to create accurate predictions. The decision making model might encompass a variety of statistical techniques (e.g., modeling, machine learning, data mining, etc.) that analyze current and historical facts to make predictions about future events (e.g., the effectiveness of a supplemental review process). The term "analytics" may refer to the use of skills, technologies, and/or practices to explore and investigate past performance, gain insight, and/or drive decision making. By using quantitative metrics and analysis, a decision model may help make more accurate decisions and better predict risks associated with those decisions and associated entities.

Note that the supplemental review process indication for the potential new risk association of each entity generated by the advanced analytics decision making model might comprise a binary indication (and the "pre-determined condition" referenced in S240 might simply comprise all records receiving "1" being routed for supplemental review). As another example, the supplemental review process indication might comprise a numerical score or value (e.g., from 0 through 100). In this case, the "pre-determined condition" reference in S240 might be that all records receiving a score of 80 or higher will be routed for supplemental review, the 25 records receiving the highest scores will be routed for supplemental review, etc. Some embodiments might allocate a fixed percentage of review or underwriting capacity to the highest scoring policies and the remaining percentage of the review or underwriting capacity to a random sample of policies across the remaining scores. For example, if an insurance enterprise has the capacity for 100 policies reviews, the system might use 70% of that capacity on the 70 highest scoring policies and the remaining 30 policies would be randomly selected, such that the system may evaluate policies across all scores without overloading capacity constraints (which could, in some embodiments change on a daily basis, weekly basis, monthly basis, etc.) and/or plan to add additional capacity (e.g., additional underwriters) to a review process as appropriate.

Figure 3:
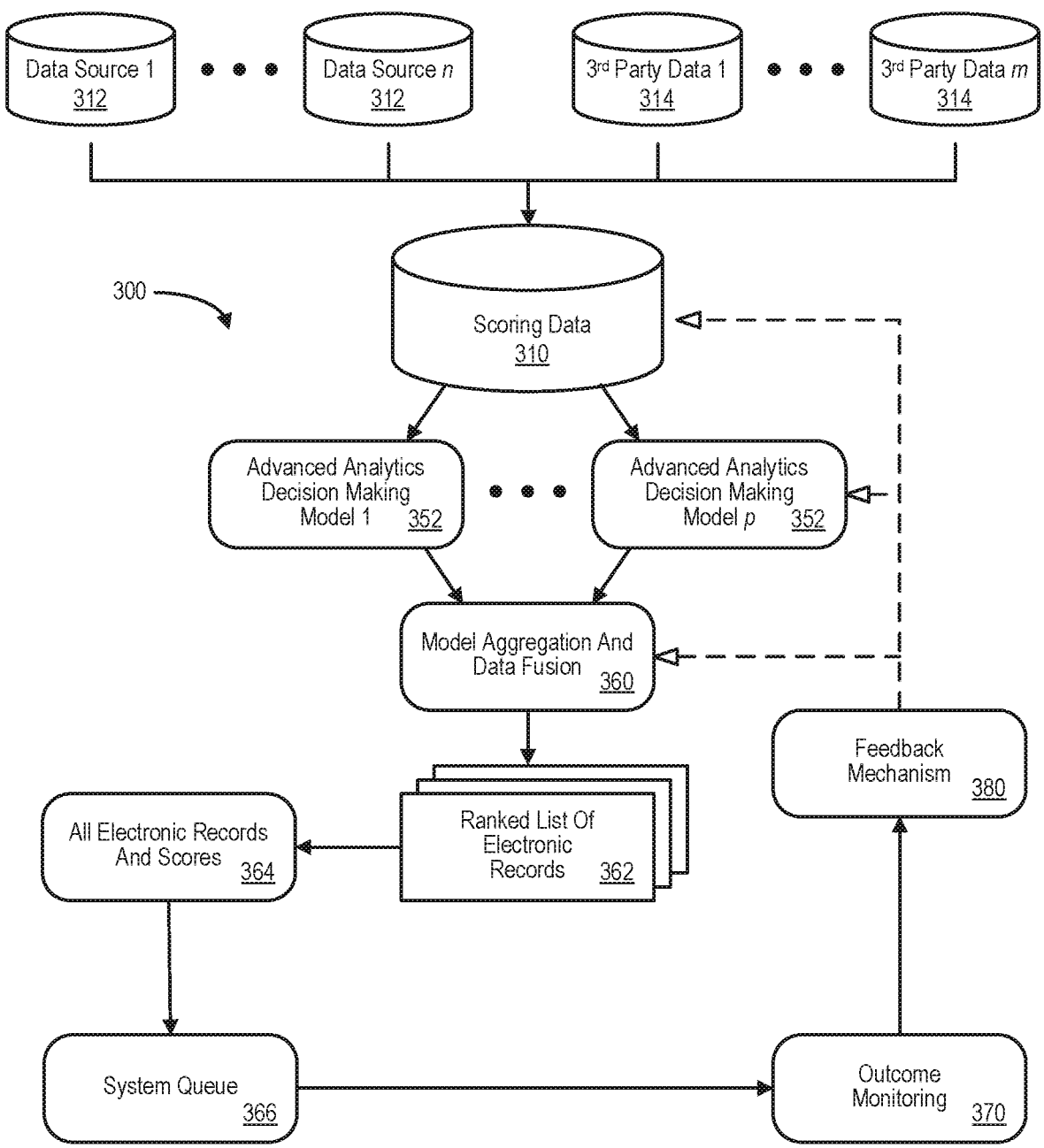
FIG. 3 is a process flow in accordance with some embodiments of the present invention.

FIG. 3 is a process flow 300 in accordance with some embodiments of the present invention. Initially, data may be collected and stored into data sources 1 through n 312 (e.g., internal to an enterprise) and/or third-party data elements 1 through m 314 (e.g., external to the enterprise). Information from the internal data sources 312 and third-party data elements 314 may be combined at a single scoring data 310 storage unit. For example, the scoring data 310 might comprise a set of electronic records, each record being associated with a new potential risk association with an entity and including a record identifier and a set of record characteristic values (e.g., based on the data sources 312 and third party data elements 314).

According to some embodiments, information from the scoring data 310 may be fed into a number of different, independent models. In particular, information from the scoring data 310 may be fed into advanced analytics decision making models 1 through p 352. The outputs of these models 352 may then be collected by a model aggregation and data fusion element 360 (e.g., that might assign results from different models 352 different weights depending on a type of electronic record, a likelihood value received from each model 352, etc.). In particular, the models 352 and model aggregation and data fusion element 360 identify which electronic records in the scoring data 310 would most benefit from a supplemental review process or procedure (e.g., in situations where it is not practical to perform the supplemental review process for each and every electronic record in the scoring data 310). According to some embodiments, an advanced analytics decision making model may be associated with a logistic regression and/or a probability p=Pr(Undergoing a Supplemental Review Process) and may be defined as:

$$\ln\left(\frac{p}{1-p}\right) = \beta_0 + \beta_1 x_1 + \ldots + \beta_p x_p$$

where $\beta_i$ are weighing values and $x_i$ are associated with the record characteristic values. Note that different advanced analytics decision making models might associated with: different weighing values for the same record characteristic, different record characteristic values, and/or different types of predictive models. Moreover, the model aggregation and data fusion component 360 might assign a first priority value to a first advanced analytics decision making model and a second priority value to a second advanced analytics decision making model, and the combining of outputs from those models might be based at least in party on the first and second priority values (e.g., the first model might over-ride the second model, outputs might be blended together with AND/OR Boolean operations, etc.).

The model aggregation and data fusion element 360 may then output a ranked list 362 of electronic records. The list 362 might be ranked, for example, beginning with those electronic records that are most likely to benefit from the supplemental review process and end with those electronic records that are least likely to benefit from the supplemental review process. According to other embodiments, the model aggregation and data fusion element 360 instead outputs a list of only those electronic records that would benefit from the supplemental review process. All of the electronic records 364 may then be processed via a system queue 366 (e.g., with a sub-set of the records undergoing the supplemental review process). Outcome monitoring 370 and/or a feedback mechanism 380 may then be used to fine tune the scoring data 310, the model aggregation and data fusion component 360 and/or the models 352 such that more accurate results might be achieved in the future (e.g., those records that actually will benefit from the supplemental review process may be more readily and accurately identified by the process flow 300). Note that some or all of the feedback and/or tuning might be involve operator review (e.g., as illustrated by the dashed lines in FIG. 3). By way of example, it might be determined that only the first three digits of a four-digit industry classification code provide useful information, in which case one or more of the advanced analytics and decision making models 352 might be updated to examine only the first three digits.

Figure 4:
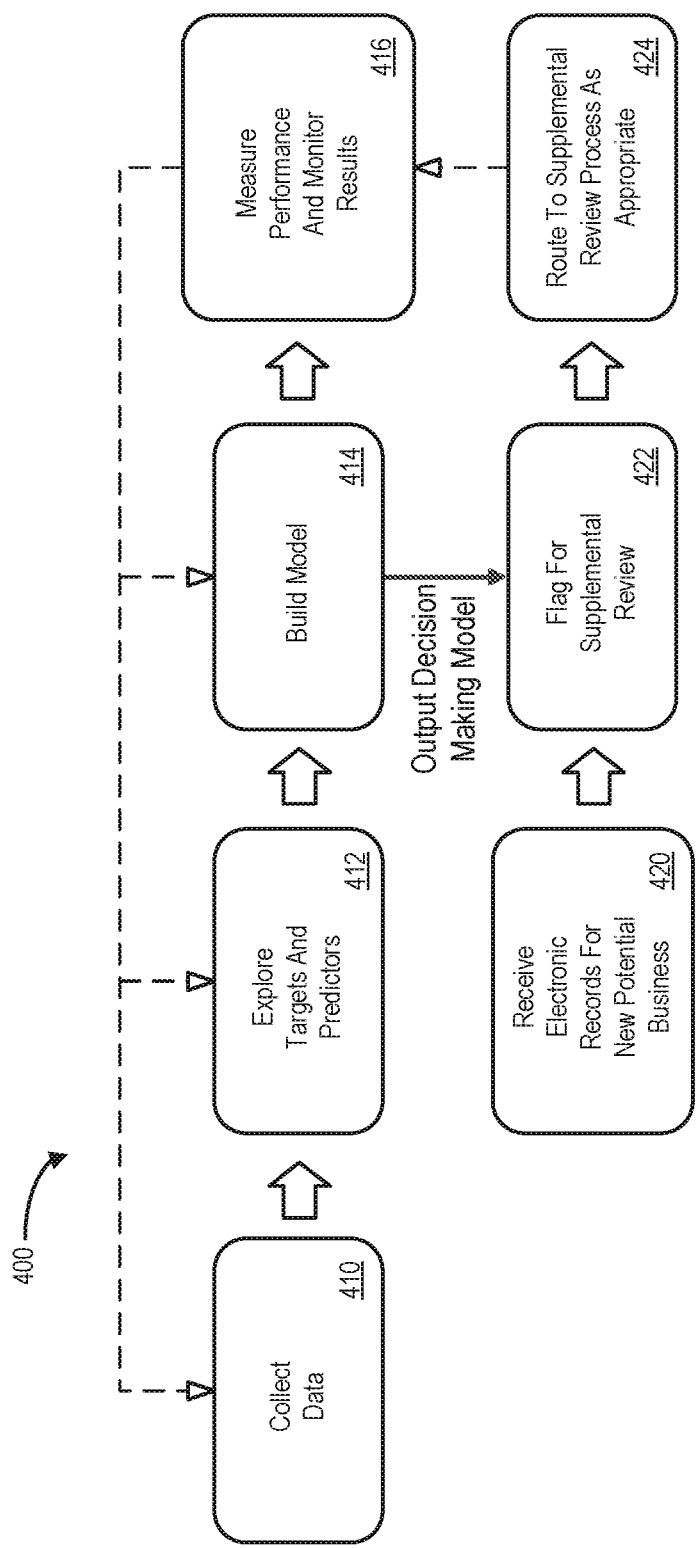
FIG. 4 is a process timeline according to some embodiments.

FIG. 4 is a process timeline 400 according to some embodiments. At 410, data may be collected. The collected data might, for example, be associated with prior risk associations, record characteristic values, and/or outcomes (e.g., performance values and/or results of past supplemental review processes). At 412, targets and predictors may be explored and a decision making model may be created at 414 and output. For example, it might be automatically determined that one or more record characteristic values tend to accurately predict eventual supplemental review process results. At 420, one or more electronic records may be received and the decision making model may be used to identify (e.g., "flag") which electronic records should undergo the supplemental review process at 422. The flagged electronic records may then be automatically routed for review as appropriate at 424. Moreover, the results of that review process may be used to measure the performance (e.g., accuracy) of the decision making model and/or to monitor overall system results at 416. The results of these measurements and monitoring may then be used to adjust and/or re-analyze collected data, targets and predictors, and/or the decision making model to improve the overall operation and performance of the system. Note that some or all of the feedback and/or tuning might be involve operator review (e.g., as illustrated by the dashed lines in FIG. 4).

Figure 5:
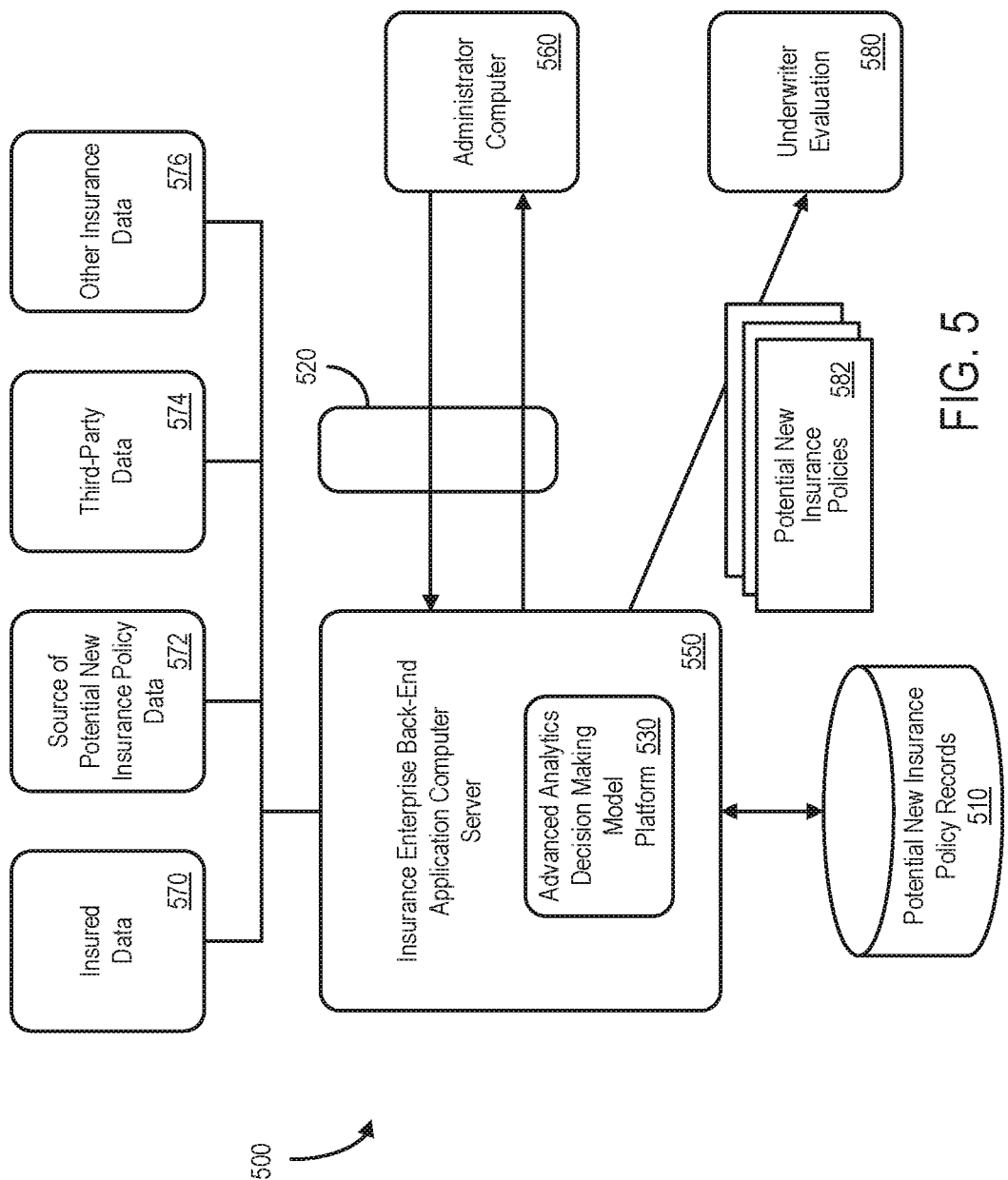
FIG. 5 is a high-level block diagram of an insurance enterprise system according to some embodiments of the present invention.

Note that embodiments described herein may be utilized by different types of enterprises. For example, FIG. 5 is a high-level block diagram of an insurance enterprise system 500 according to some embodiments of the present invention. As before, the system 500 includes an insurance enterprise back-end application computer server 550 that may access potential new insurance policy records 510 (e.g., each record representing a potential new insurance policy and including one or more communication addresses, characteristic values, attribute variables, etc.). The back-end application computer server 550 may also exchange information with a remote administrator computer 560 (e.g., via a firewall 520). According to some embodiments, an advanced analytics decision making model platform 530 of the back-end application computer server 550 may facilitate an identification of potential new insurance policies (e.g., those that would most benefit from a supplemental underwriting evaluation) and/or the display of results via one or more remote administrator computers 560. The back-end application computer server 550 might be, for example, associated with a PC, laptop computer, smartphone, an enterprise server, a server farm, and/or a database or similar storage devices. Devices, including those associated with the back-end application computer server 550 and any other device described herein, may exchange information via any communication network which may be one or more of a LAN, a MAN, a WAN, a proprietary network, a PSTN, a WAP network, a Bluetooth network, a wireless LAN network, and/or an IP network such as the Internet, an intranet, or an extranet.

The back-end application computer server 550 may store information into and/or retrieve information from the insurance policy records 510. The potential new insurance policy records 510 might, for example, store insurance policy identifiers, communication addresses, characteristic values (e.g., an employer location, a type of business, one or more keywords associated with the business, etc.), and/or attribute variables. The potential new insurance policy records 510 may also contain information about past and current interactions with parties, including those associated with remote communication devices. According to this embodiment, the computer server 550 may also exchange information with a distribution center (e.g., to arrange for postal mailing to be distributed and collected in connection with an insurance policy quote process), a telephone call center (e.g., to arrange for telephone calls to be made in connection with new insurance quotes), an email server, a third-party data device (e.g., to receive business credit score data, governmental information, etc.), and/or one or more predictive models.

Thus, some embodiments are associated with potential new risk associations (potential new insurance policies) with entities (potential insureds). Those potential new insurance policies 582 that are flagged by the advanced analytics decision making model platform 530 may then be automatically routed for underwriter evaluation 580.

According to some embodiments, at least one of the set of record characteristic values represents a characteristic of the insured 570. For example, the data about the insured or entity might include location information, such as a ZIP code, postal address, or county of operation. Another example of insured data 570 might comprise industry information, such as a classification code describing a type of business associated with the potential insured. In this case, a generic, general, "other," or "No Exact Classification ("NEC")" description (or a mismatch between an internally generated code and a code supplied by a third-party) might be associated with a potential new insurance policy that should undergo the additional underwriting evaluation 580 (e.g., to better determine the exact nature of the business operated by the potential insured). Other examples of insured data include a customer score of the potential insured and a number of locations and/or states where a business operates. According to some embodiments, a potential insured might be associated with a list of keywords or tags. In this case, a presence of one or more restricted terms, such as "hazardous," "SCUBA," or "go-cart," might indicate that the potential insurance policy should undergo further underwriter evaluation 580. As another example, the fact that a potential insured included in its name the phrase "Doing Business As" or the acronym "D.B.A." might indicate that the potential insured was submitting information in an accurate manner (and might make it a less likely candidate for further underwriting evaluation 580).

According to some other embodiments, at least one of the record characteristic values represents an original source of the electronic record (e.g., source of the electronic record associated with the potential new insurance policy 572). For example, the source of potential new insurance policy data 572 might include an identifier of the original source from which the potential new insurance policy was received (e.g., with some sources historically providing potential new insurance policies that typically did not need further underwriter evaluation), an insurance agency score, a cancel rate, a new-business cancel rate, a back-dating rate, a declination rate, a return on equity value, and/or an ultimate cost ratio. According to some embodiments, information about a potential new insurance policy might be entered by, for example, an insurance agent, and automatically be flagged or assigned a "hard stop" when the entered value is unacceptable to the insurance entity. According to some embodiments, the insurance policy data 572 includes information about whether or not a hard stop was generated, how many hard stops were generated, etc.

According to still other embodiments, at least one of the record characteristic values represents third-party data 574. Examples of third-party data 574 might include, for example, a business credit score (e.g., with struggling business perhaps being more likely to benefit from the additional underwriting evaluation 580), a comparison of a third party industry classification code with an internally generated classification code, social media information (e.g., including customer reviews and ratings), economic indicators, and/or macro-economic conditions. In yet other embodiments, at least some of the record characteristic values are associated with other types of insurance 576. The other insurance data 576 might be associated with, for example, existing and/or potential new policies of workers' compensation insurance, disability insurance, and/or general liability insurance.

Record characteristic values may be collected in a number of different ways. For example, each electronic record (e.g., potential new insurance policy record 510) may be associated with a record identifier and a communication address, and the sets of record characteristic values might be collected by sending a communication to that communication address and receiving, from a party associated with an electronic record having that communication address, a response to the communication. Note that a postal mailing might be automatically generated and/or received by a distribution center, an email might be automatically generated by an email server, information could be provided and/or collected via: a web interface, an Interactive Voice Response ("IVR") system associated with a telephone call center, a chat application that interacts with a party in substantially real time, and/or a video link (e.g., with an insurance agent or underwriter). According to some embodiments, after the potential new insurance policies 582 are identified for the underwriter evaluation 580), the back-end application computer server 550 is further to periodically monitor performance outcomes and automatically adjust the advanced analytics decision making model (e.g., to improve outcomes, risk profitability, risk quality, policy growth, etc.). The performance outcomes might be associated with, for example, manual underwriting decisions, a Direct Notice Of Cancelation ("DNOC"), a Do Not Renew ("DNR") decision, endorsement activity (e.g., limiting risk associated with a particular insurance policy), and/or a level of verifiability (e.g., how easily information can be confirmed or verified via public data records, third-party data 574, etc.).

Figure 6:
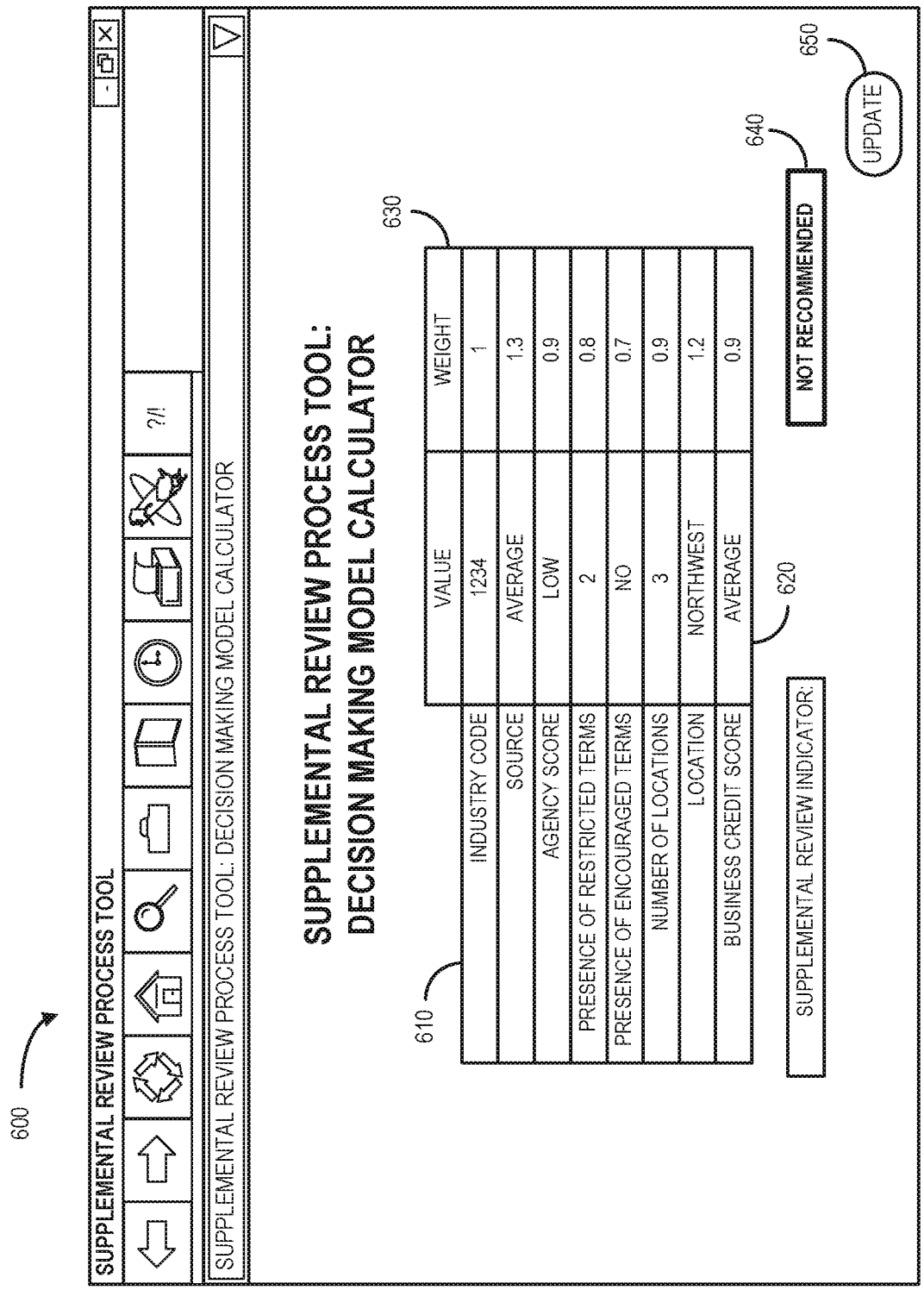
FIG. 6 illustrates an exemplary model calculator display that might be associated with various embodiments.

FIG. 6 illustrates an exemplary decision making model calculator display 600 (e.g., associated with a supplemental review process recommendation) that might be associated with various embodiments described herein. The display 600 includes a number of different types of record attributes 610 (e.g., an industry code, an insurance agency score, a business credit score, etc.) along with values 620 for each type of record attribute 610. The model calculator display 600 further includes a weighting or component score 630 for each type of record attribute 610 which may be used to calculate an overall decision making model result 640 (e.g., whether or not a supplemental underwriting evaluation is recommended based on the values 620 and weights 630). The result 640 might be generated and/or updated, for example, upon selection of an update icon 650 by an underwriter and might be used to evaluate a potential insurance policy and/or the operation of the model. The advanced analytics decision making model is associated with a probability p=Pr(Undergoing a Supplemental Review Process) and may be defined as:

$$\ln\left(\frac{p}{1-p}\right) = \beta_0 + \beta_1 x_1 + \ldots + \beta_p x_p$$

wherein $\beta_i$ are weighing values and $x_i$ are associated with the record characteristic values.

Figure 7:
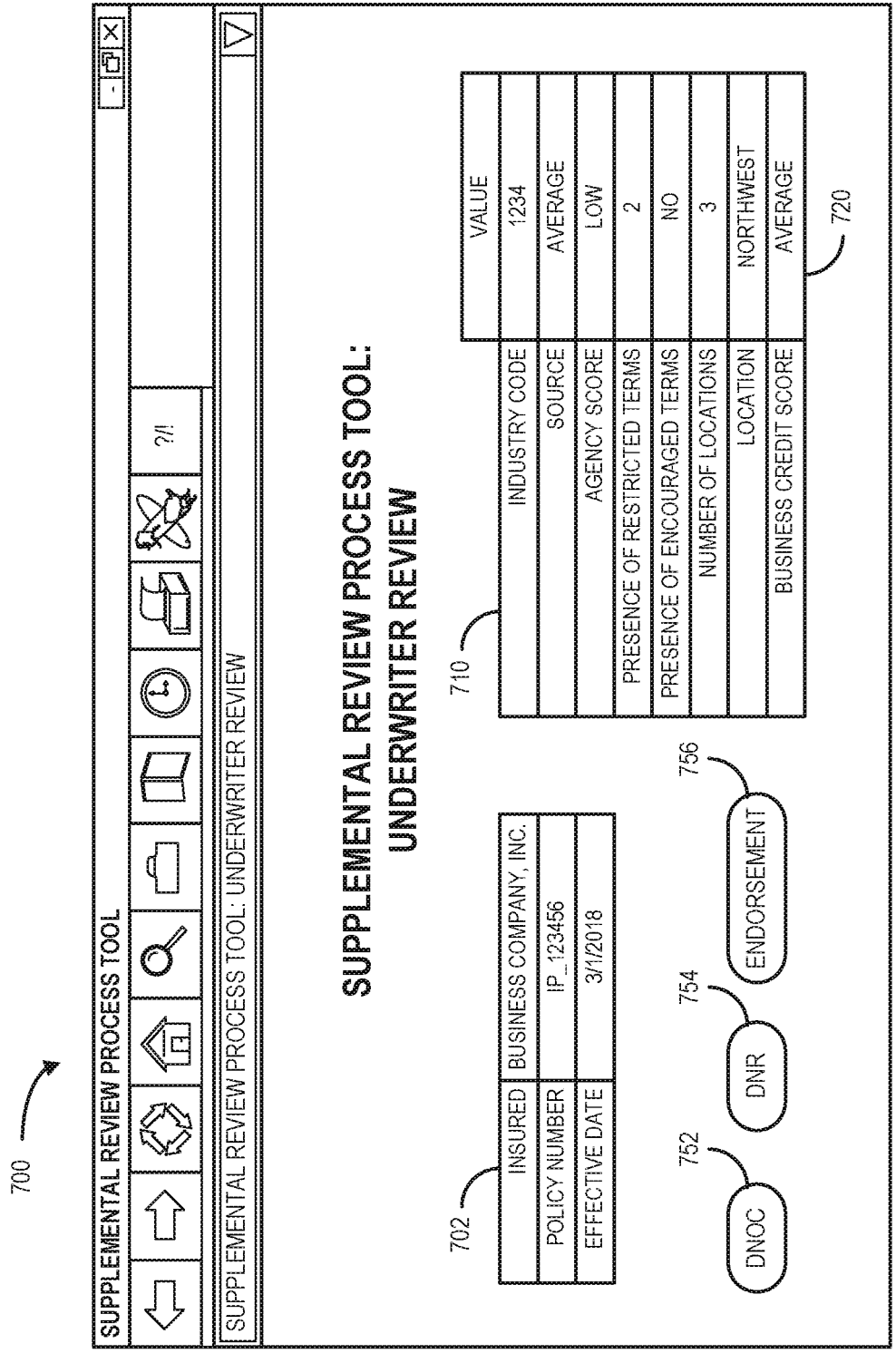
FIG. 7 illustrates an exemplary underwriting evaluation display according to some embodiments of the present invention.

When the result 640 indicates that a supplemental underwriting evaluation is "recommended"—data may be automatically routed and/or display via an underwriting platform. For example, FIG. 7 illustrates an underwriter review display 700 in accordance with some embodiments. The display 700 includes basic information 702 about a particular potential new insurance policy that has been automatically flagged for further review and routed to the underwriter (e.g., the potential insured's name, effective date of the potential insurance policy, etc.). The display 700 further includes attributes 710 and values 720 that might be further reviewed by the underwriter. The underwriter might then use the display to make a DNOC, DNR, endorsement recommendation, etc. According to some embodiments, the attributes 710, values 720, model results, ranked location in a list, etc. might not be provided to an underwriter via any display (e.g., to help him or her avoid pre-judging a potential new insurance policy).

Thus, some embodiments may help optimize a new business referral process to identify "at risk" insurance policies for further review. For example, those policies most likely to result in a DNOC or endorsement (given the submitted policy characteristics) may be automatically identified. Moreover, embodiments may provide a mechanism to utilize internal and/or third-party information as a means to identify predictive elements or situations within a policy and rank the policies based on desired outcomes. Such an approach may let an insurance entity understand, leverage, and drive continuity within rules associated across new business, mid-term, and renewal business. According to some embodiments, the underwriting scoring models described herein may enable new business writers to focus efforts on policies where attention will have the largest impact on the direct to bindable book of insurance business. The model may represent an amalgamation of factors, including those driving higher risk, dynamic underwriting exposure concerns, and/or agency characteristics. Further, some embodiments may allow for the prioritization of scarce underwriting resource capacity such that underwriters can have the most impact.

Figure 8:
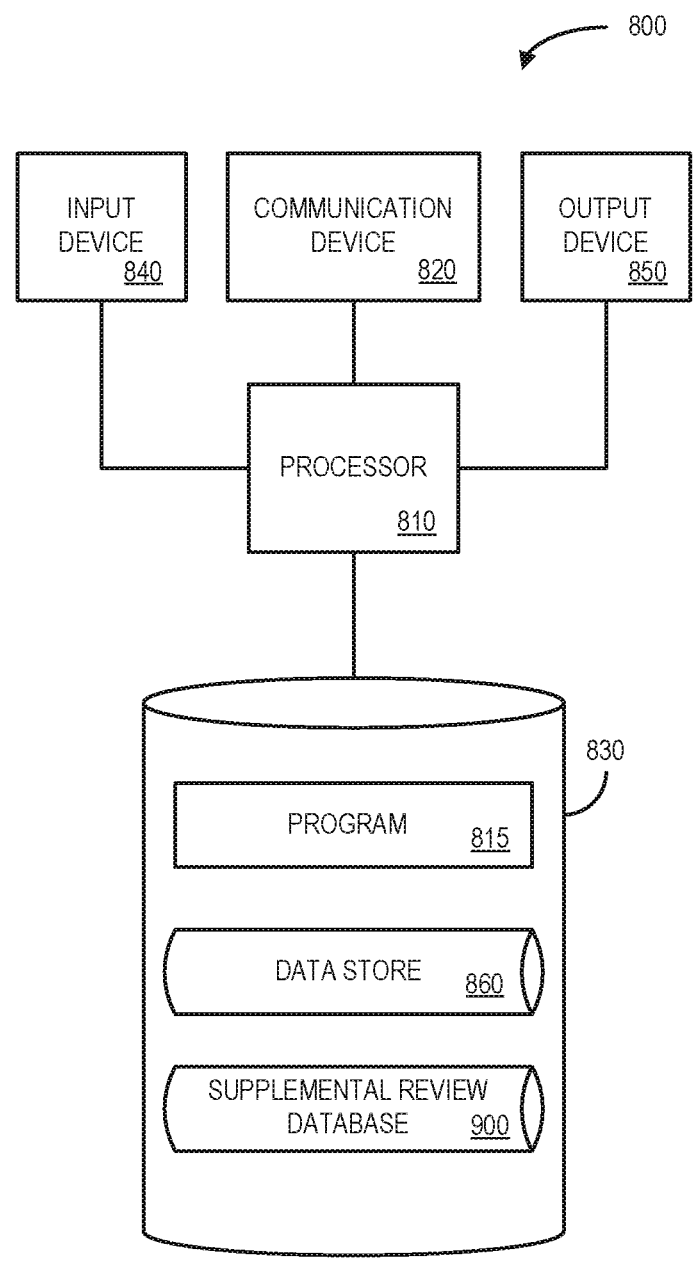
FIG. 8 is a block diagram of an apparatus in accordance with some embodiments of the present invention.

Embodiments described herein may comprise a tool that gives guidance and a suggested list of potential insurance policies for further evaluation to an underwriter and that may be implemented using any number of different hardware configurations. For example, FIG. 8 illustrates a back-end application computer server 800 that may be, for example, associated with the systems 100, 500 of FIGS. 1 and 5, respectively. The back-end application computer server 800 comprises a processor 810, such as one or more commercially available Central Processing Units ("CPUs") in the form of one-chip microprocessors, coupled to a communication device 820 configured to communicate via a communication network (not shown in FIG. 8). The communication device 820 may be used to communicate, for example, with one or more remote administrator or underwriter computers and/or communication devices (e.g., PCs and smartphones). Note that communications exchanged via the communication device 820 may utilize security features, such as those between a public internet user and an internal network of the insurance enterprise. The security features might be associated with, for example, web servers, firewalls, and/or PCI infrastructure. The back-end application computer server 800 further includes an input device 840 (e.g., a mouse and/or keyboard to enter information about potential insurance policies, historic information, decision making models, etc.) and an output device 850 (e.g., to output reports regarding system administration and/or underwriting review performance).

The processor 810 also communicates with a storage device 830. The storage device 830 may comprise any appropriate information storage device, including combinations of magnetic storage devices (e.g., a hard disk drive), optical storage devices, mobile telephones, and/or semiconductor memory devices. The storage device 830 stores a program 815 and/or a risk evaluation tool or application for controlling the processor 810. The processor 810 performs instructions of the program 815, and thereby operates in accordance with any of the embodiments described herein. For example, the processor 810 may automatically identify electronic records to be routed to a supplemental review process via an automated back-end application computer server. In particular, the processor 810 might access a data store containing electronic records, each electronic record representing a potential new risk association with an entity, and each electronic record may contain a record identifier and a set of record characteristic values. The processor 810 may then automatically generate, by an advanced analytics decision making model based on the record characteristic values, a supplemental review process indication for the potential new risk association of each entity. Indications representing the supplemental review process indications may be transmitted by the processor 810 in connection with an interactive user interface display and the processor 810 may arrange for electronic records having supplemental review process indications that meet a pre-determined condition to be automatically routed (e.g., via the communication device 820) such that those electronic records will undergo the supplemental review process.

The program 815 may be stored in a compressed, uncompiled and/or encrypted format. The program 815 may furthermore include other program elements, such as an operating system, a database management system, and/or device drivers used by the processor 810 to interface with peripheral devices.

As used herein, information may be "received" by or "transmitted" to, for example: (i) the back-end application computer server 800 from another device; or (ii) a software application or module within the back-end application computer server 800 from another software application, module, or any other source.

In some embodiments (such as shown in FIG. 8), the storage device 830 further stores a computer data store 860 (e.g., associated with a set of destination communication addresses, record characteristic values, attribute variables, etc.) and a supplemental review database 900. An example of a database that might be used in connection with the back-end application computer server 800 will now be described in detail with respect to FIG. 9. Note that the database described herein is only an example, and additional and/or different information may be stored therein. Moreover, various databases might be split or combined in accordance with any of the embodiments described herein. For example, the computer data store 860 and/or supplemental review database 900 might be combined and/or linked to each other within the program 815.

Figure 9:
FIG. 9 is a portion of a tabular supplemental review database in accordance with some embodiments.

Referring to FIG. 9, a table is shown that represents the supplemental review database 900 that may be stored at the back-end application computer server 800 according to some embodiments. The table may include, for example, entries identifying new potential insurance policies. The table may also define fields 902, 904, 906, 908, 910, 912 for each of the entries. The fields 902, 904, 906, 908, 910, 912 may, according to some embodiments, specify: an electronic record identifier 902, a communication address 904, values associated with location information 906, values associated with agency scores 908, values associated with business credit data 910, and a supplemental review indication 912. The supplemental review database 900 may be created and updated, for example, based on information electrically received from a computer data store and/or an insurance underwriter or agent.

The electronic record identifier 902 may be, for example, a unique alphanumeric code identifying a potential new insurance policy and the communication address 904 might be used to collect information about that insurance policy (e.g., a type of business, a source of the potential insurance policy, etc.). The collected information might include internal (e.g., to an insurance enterprise) and/or external data such as the values associated with location information 906, the values associated with agency scores 908, and the values associated with business credit data 910. This collected information may then be used by the decision making model to automatically generate the supplemental review indication 912 (e.g., indicating whether or not the electronic record associated with electronic record identifier 902 should be routed to a supplemental review process or platform).

Figure 10:
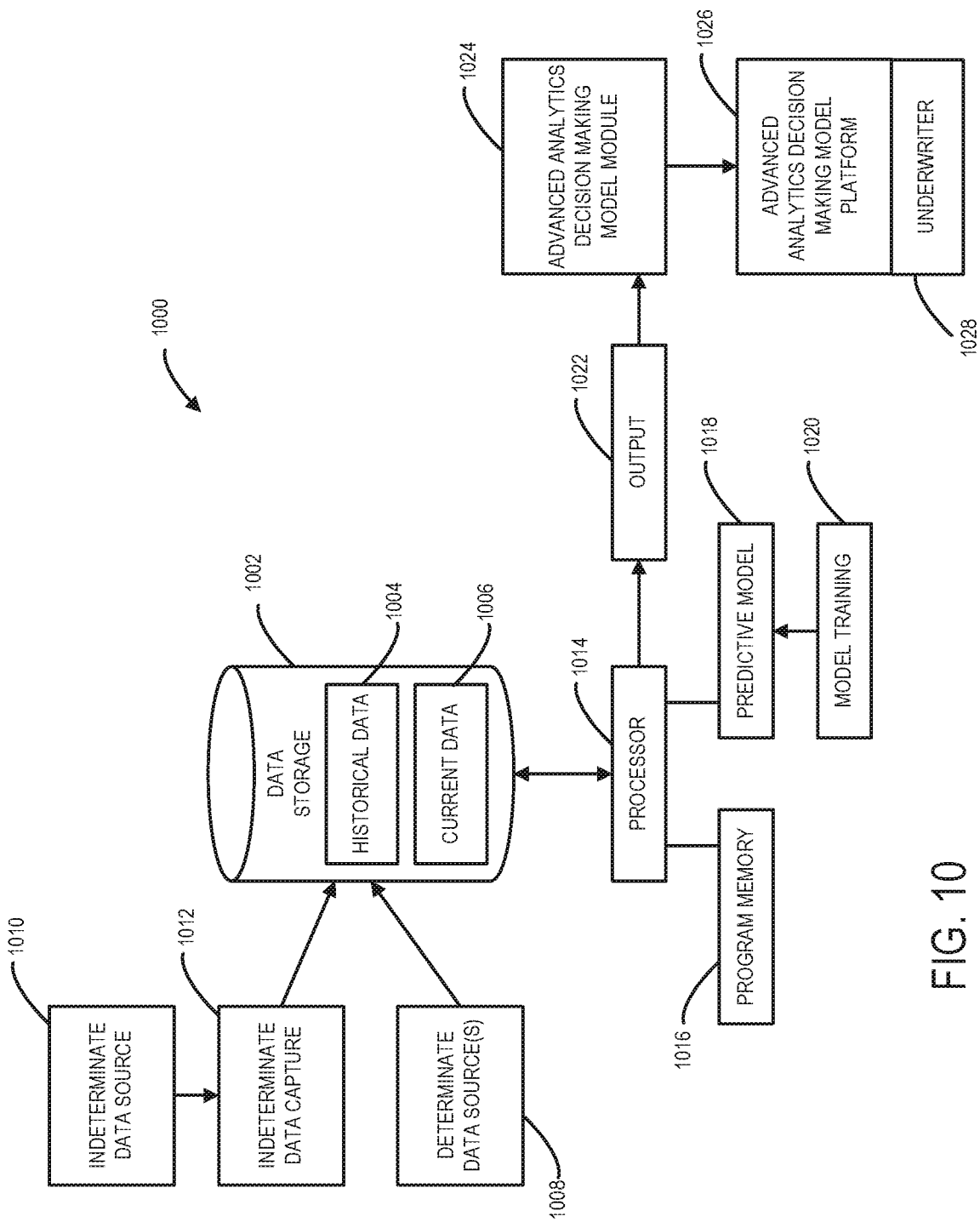
FIG. 10 illustrates a system having a predictive model in accordance with some embodiments.

According to some embodiments, one or more predictive models (e.g., decision models) may be used to select, create, update, route, and/or evaluate electronic records. Features of some embodiments associated with a predictive model will now be described by first referring to FIG. 10. FIG. 10 is a partially functional block diagram that illustrates aspects of a computer system 1000 provided in accordance with some embodiments of the invention. For present purposes it will be assumed that the computer system 1000 is operated by an insurance company (not separately shown) for the purpose of supporting new insurance policy business (e.g., to determine which new insurance policies should be evaluated by an underwriter).

The computer system 1000 includes a data storage module 1002. In terms of its hardware the data storage module 1002 may be conventional, and may be composed, for example, by one or more magnetic hard disk drives. A function performed by the data storage module 1002 in the computer system 1000 is to receive, store and provide access to both historical transaction data (reference numeral 1004) and current transaction data (reference numeral 1006). As described in more detail below, the historical transaction data 1004 is employed to train a predictive model to provide an output that indicates an identified performance metric (e.g., whether a supplemental review process is appropriate) and/or an algorithm to score performance factors, and the current transaction data 1006 is thereafter analyzed by the predictive model. Moreover, as time goes by, and results become known from processing current transactions (e.g., underwriting decisions made in connection with other insurance policies), at least some of the current transactions may be used to perform further training of the predictive model. Consequently, the predictive model may thereby appropriately adapt itself to changing conditions.

Either the historical transaction data 1004 or the current transaction data 1006 might include, according to some embodiments, determinate and indeterminate data. As used herein and in the appended claims, "determinate data" refers to verifiable facts such as the an age of a business; an automobile type; a policy date or other date; a time of day; a day of the week; a geographic location, address or ZIP code; and a policy number.

As used herein, "indeterminate data" refers to data or other information that is not in a predetermined format and/or location in a data record or data form. Examples of indeterminate data include narrative speech or text, information in descriptive notes fields and signal characteristics in audible voice data files.

The determinate data may come from one or more determinate data sources 1008 that are included in the computer system 1000 and are coupled to the data storage module 1002. The determinate data may include "hard" data like a potential insured's name, date of establishment, industry code, keywords and phrases, policy number, address, an underwriter decision, etc. One possible source of the determinate data may be the insurance company's policy database (not separately indicated).

The indeterminate data may originate from one or more indeterminate data sources 1010, and may be extracted from raw files or the like by one or more indeterminate data capture modules 1012. Both the indeterminate data source(s) 1010 and the indeterminate data capture module(s) 1012 may be included in the computer system 1000 and coupled directly or indirectly to the data storage module 1002. Examples of the indeterminate data source(s) 1010 may include data storage facilities for document images, for text files, and digitized recorded voice files. Examples of the indeterminate data capture module(s) 1012 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual.

The computer system 1000 also may include a computer processor 1014. The computer processor 1014 may include one or more conventional microprocessors and may operate to execute programmed instructions to provide functionality as described herein. Among other functions, the computer processor 1014 may store and retrieve historical insurance transaction data 1004 and current transaction data 1006 in and from the data storage module 1002. Thus the computer processor 1014 may be coupled to the data storage module 1002.

The computer system 1000 may further include a program memory 1016 that is coupled to the computer processor 1014. The program memory 1016 may include one or more fixed storage devices, such as one or more hard disk drives, and one or more volatile storage devices, such as RAM devices. The program memory 1016 may be at least partially integrated with the data storage module 1002. The program memory 1016 may store one or more application programs, an operating system, device drivers, etc., all of which may contain program instruction steps for execution by the computer processor 1014.

The computer system 1000 further includes a predictive model component 1018. In certain practical embodiments of the computer system 1000, the predictive model component 1018 may effectively be implemented via the computer processor 1014, one or more application programs stored in the program memory 1016, and computer stored as a result of training operations based on the historical transaction data 1004 (and possibly also data received from a third party). In some embodiments, data arising from model training may be stored in the data storage module 1002, or in a separate computer store (not separately shown). A function of the predictive model component 1018 may be to determine appropriate underwriting evaluation routing decisions for a set of new potential insurance policies. The predictive model component may be directly or indirectly coupled to the data storage module 1002.

The predictive model component 1018 may operate generally in accordance with conventional principles for mixed effect predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program any type of predictive model, such as a fixed effect or mixed effect predictive model, to operate as described herein.

Still further, the computer system 1000 includes a model training component 1020. The model training component 1020 may be coupled to the computer processor 1014 (directly or indirectly) and may have the function of training the predictive model component 1018 based on the historical transaction data 1004 and/or information about potential insureds. (As will be understood from previous discussion, the model training component 1020 may further train the predictive model component 1018 as further relevant data becomes available.) The model training component 1020 may be embodied at least in part by the computer processor 1014 and one or more application programs stored in the program memory 1016. Thus, the training of the predictive model component 1018 by the model training component 1020 may occur in accordance with program instructions stored in the program memory 1016 and executed by the computer processor 1014.

In addition, the computer system 1000 may include an output device 1022. The output device 1022 may be coupled to the computer processor 1014. A function of the output device 1022 may be to provide an output that is indicative of (as determined by the trained predictive model component 1018) particular performance metrics, automatically flagged electronic records, etc. The output may be generated by the computer processor 1014 in accordance with program instructions stored in the program memory 1016 and executed by the computer processor 1014. More specifically, the output may be generated by the computer processor 1014 in response to applying the data for the current simulation to the trained predictive model component 1018. The output may, for example, be a binary value, a numerical estimate, and/or likelihood within a predetermined range of numbers. In some embodiments, the output device may be implemented by a suitable program or program module executed by the computer processor 1014 in response to operation of the predictive model component 1018.

Still further, the computer system 1000 may include an advanced analytics decision making model module 1024. The advanced analytics decision making model module 1024 may be implemented in some embodiments by a software module executed by the computer processor 1014. The advanced analytics decision making model module 1024 may have the function of rendering a portion of the display on the output device 1022 and/or routing certain electronic records. Thus, the advanced analytics decision making model module 1024 may be coupled, at least functionally, to the output device 1022 and/or a workflow router. In some embodiments, for example, the advanced analytics decision making model module 1024 may report results and/or predictions by routing, to an underwriter 1028 via an advanced analytics decision making model platform 1026, a results log, and/or automatically generated supplemental review recommendations generated by the predictive model component 1018. In some embodiments, this information may be provided to the underwriter 1028 who may also be tasked with determining how to proceed and/or whether or not the results may be improved (e.g., by further adjusting a potential insurance policy and/or making recommendations about the predictive model 1018).

Thus, embodiments may provide an automated and efficient way to identify which potential new insurance policies should undergo a supplemental underwriting evaluation. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

According to some embodiments, a decision making model may generate a model tier score associated with a potential new insurance policy. This information may then be used to rank all policies by tier score and potential new insurance policies may be grouped into ten groups of substantially equal business. Moreover, an underwriting decision can be calculated for each decile and results may be compared (e.g., to evaluate and/or improve the results of a decision making model for potential new insurance policies).

Figure 11:
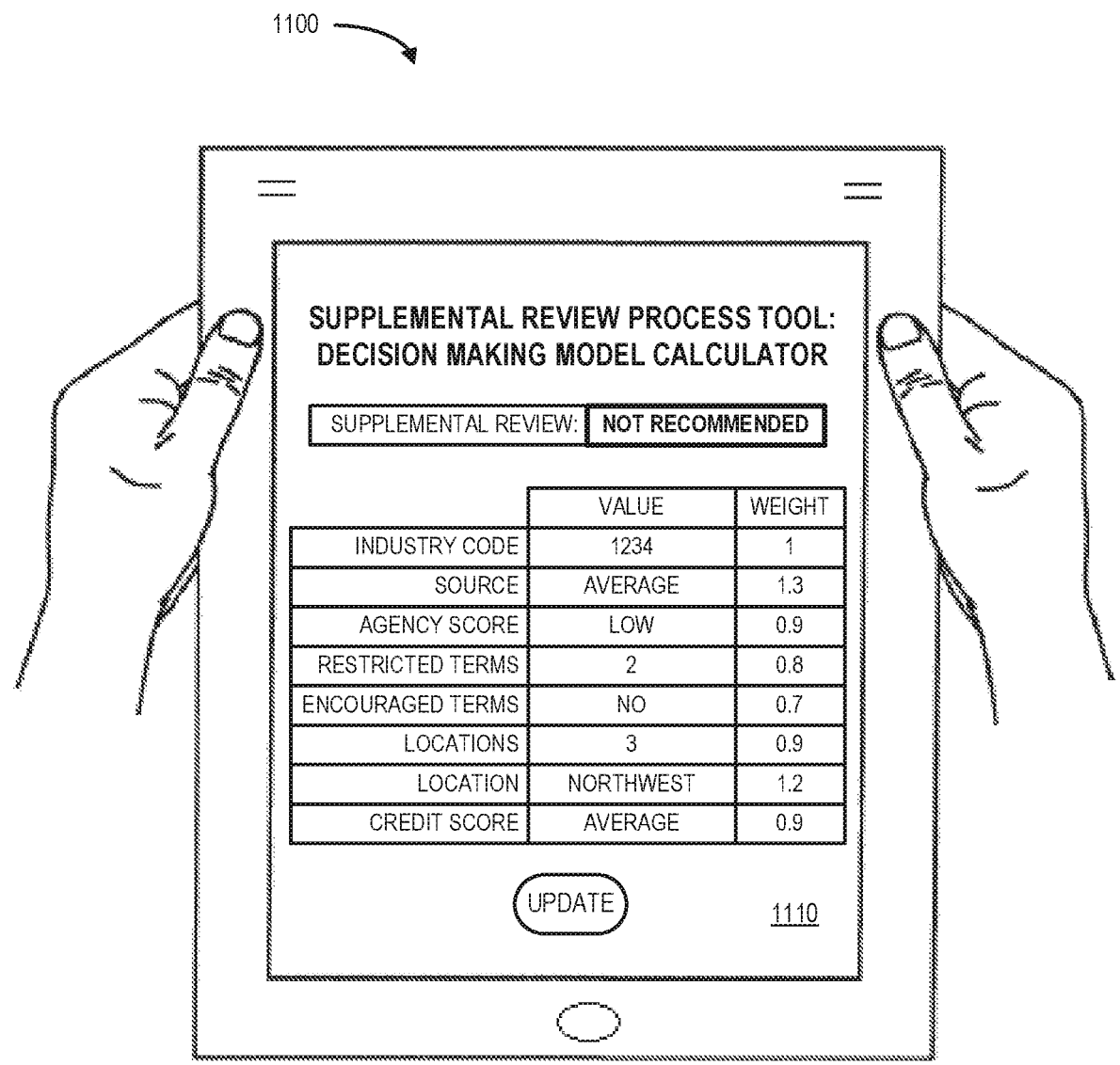
FIG. 11 illustrates a tablet computer displaying a model calculator according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of communication addresses, embodiments may instead be associated with other types of communications (e.g., chat implementations, web-based messaging, etc.). Similarly, although certain types of record characteristic values were described in connection some embodiments, other types of data might be used instead. Still further, the displays and devices illustrated herein are only provided as examples, and embodiments may be associated with any other types of user interfaces. For example, FIG. 11 illustrates a handheld tablet computer 1100 displaying a decision making model calculator display 1110 according to some embodiments. The decision making model calculator display 1110 might include user-selectable graphical data providing information about electronic records (and supplemental review process related information) that can be selected and/or modified by a user of the handheld computer 1100.

Figure 12:
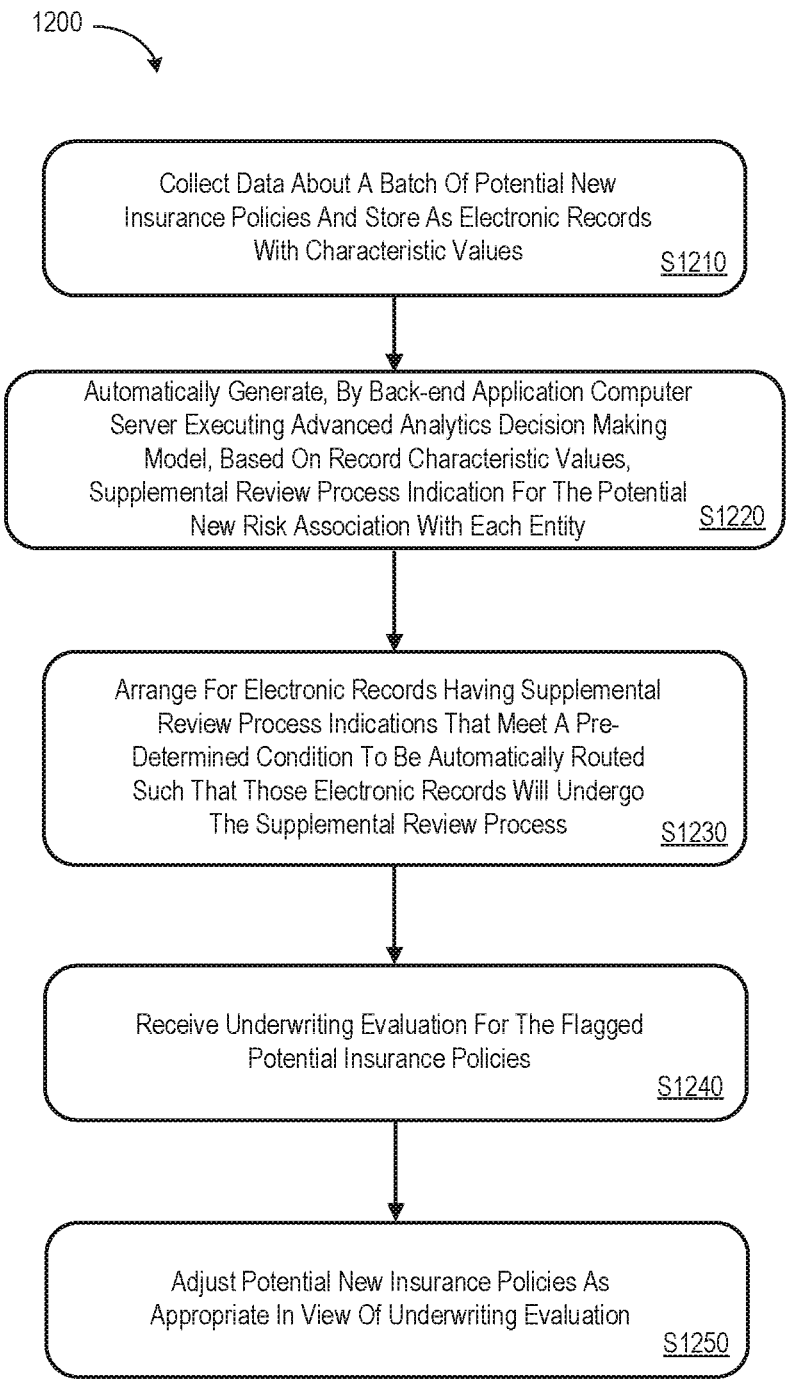
FIG. 12 illustrates an overall enterprise workflow in accordance with some embodiments.

Note that embodiments described herein might be used in connection with a number of different types of business process flows. For example, FIG. 12 illustrates an overall process 1200 in accordance with some embodiments. At S1210, information about a batch of potential insureds, businesses, etc. may be collected during a new insurance quote process. This information might be gathered, for example, via interviews, telephone calls, web-based forms, etc. At S1220, the system may automatically generate (using, for example, any of the decision making models and/or record characteristics described herein) supplemental review process indications for each potential new insurance policy. Based on those indications, the records associated with flagged potential new insurance policies may be automatically routed for underwriting evaluation at S1230. Those flagged policies may then undergo an underwriting review process. For example, at S1240 the underwriter may adjust one or more insurance policy parameters, such as a premium, deductible, endorsements, etc. if appropriate based on the levels of risk associated with the insured. Indications of the adjusted parameters may then be transmitted to the potential insured and the potential new insurance policies may be adjusted at S1250 (e.g., via an agent, web page, telephone call, etc.). In this way, appropriate insurance policy parameters may be assigned to a potential insurance policy as appropriate in view of an insured, industry, etc. Note that the indications of the adjusted parameters made by an underwriter might be transmitted directly to the potential insured or instead be provided via an insurance agent, a sales representative, a customer service manager, etc.

Some embodiments described herein have been described with respect to potential new insurance policies (e.g., during a quote process associated with new business). Note, however, that a "potential new" insurance policy could also refer to an insurance policy renewal.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to automatically identify electronic records to be routed to a supplemental insurance review process comprising:

(a) a data store containing a plurality of historical electronic records comprising determinate historical data originating from determinate data sources, and indeterminate historical data originating from indeterminate data sources, and a batch of electronic records representing a potential new risk association with an entity, wherein each record in the batch of electronic records contains a record identifier and a set of record characteristic values including at least:

one record characteristic value representing a characteristic of the entity, one record characteristic value representing an original source of the each record, and one record characteristic value representing third-party data;

(b) an application computer server coupled to the data store including at least one processor and a non-tangible, computer readable medium storing programmed instructions configured to:
  extract the indeterminate historical data from raw files;
  store the indeterminate historical data, the determinate historical data, and the data representing potential new risk associations in the data store;
  train a plurality of independent analytics decision making models using the stored indeterminate and determinate historical data, wherein the plurality of trained independent analytics decision making models apply statistical techniques including at least machine learning, and wherein at least one of the plurality of independent analytics decision making models is associated with a probability, p, of an electronic record representing a potential new risk undergoing a supplemental review process defined as:

$$p = \ln\left(\frac{p}{1-p}\right) = \beta_0 + \beta_1 x_1 + \ldots + \beta_p x_p,$$

wherein $\beta_i$ are weighing values and $x_i$ are associated with the record characteristic values;
  apply the plurality of independent analytics decision making models to the each record and its corresponding set of record characteristic values;
  combine, by a data fusion component, output from the plurality of independent analytics decision making models based on a priority assigned to each model;
  determine, based upon the combined output of the data fusion component, a score value associated with the each record;
  generate a ranked list of the score values associated with the each record beginning with those representing a potential new risk association most likely to benefit from the supplemental review process and ending with those least likely to benefit from the supplemental review process;
  transmit the ranked list to an interactive user interface display;
  automatically route the each record in the ranked list having a score value above a pre-determined threshold to a remote administrator computer to undergo the supplemental review process;
  monitor performance outcomes including at least one of risk profitability, risk quality and policy growth for the potential new risk association represented by the batch of electronic records to which the plurality of independent analytics decision making models were applied;
  reanalyze the performance outcomes, the historical data, and the ranked list of score values associated with the each record identified for supplemental review to measure the accuracy of each of the trained independent analytics decision making models; and
  fine tune the independent analytics decision making models and the data fusion component to improve the accuracy of identifying records for supplemental review;
(c) a communication port coupled to the back-end application computer server and the data store to facilitate the transmission of data to the interactive user interface display and the routing of electronic records.

2. The system of claim 1, wherein at least one of the plurality of independent analytics decision making models is associated with at least one of: (i) different weighing values for the same record characteristic, (ii) different record characteristic values, and (iii) different types of predictive models.

3. The system of claim 2, wherein the model aggregation and data fusion component assigns a first priority value to a first analytics decision making model and a second priority value to a second analytics decision making model, and said combining is based at least in part on the first and second priority values.

4. The system of claim 1, wherein the score value for the each record is not displayed via the interactive user interface display.

5. The system of claim 1, wherein the each record is associated with a potential insured the potential new risk association is a potential new insurance policy, and the supplemental review process comprises an underwriting evaluation of the potential new insurance policy.

6. The system of claim 5, wherein the at least one record characteristic value representing a characteristic of the entity includes at least three of: (i) location information, (ii) an industry, (iii) a presence of a general industry classification, (iv) a customer score, (v) a number of locations, (vi) a number of states, (vii) a presence of one or more restricted terms, and (viii) a presence of one or more encouraged terms.

7. The system of claim 5, wherein the at least one record characteristic value representing an original source of the electronic record includes at least two of: (i) an identifier of the original source from which the potential new insurance policy was received, (ii) an insurance agency score, (iii) a cancel rate, (iv) a new-business cancel rate, (v) a back-dating rate, (vi) a declination rate, (v a return on equity value, and (viii) an ultimate cost ratio.

8. The system of claim 5, wherein there the at least one record characteristic value representing third-party data includes at least two of: (i) a business credit score, (ii) a comparison of a third-party industry classification code with an internally generated classification code, (iii) social media information, (iv) economic indicators, and (v) macro-economic conditions.

9. The system of claim 3, wherein at least some of the set of record characteristic values are associated with other types of insurance, and the supplemental review process indication is generated in accordance with a presence of at least one of: (i) workers' compensation insurance, (ii) disability insurance, and (iii) general liability insurance.

10. The system of claim 1, wherein the each electronic record is associated with a record identifier and a communication address, and the sets of record characteristic values are collected via at least one of: (i) sending a communication to a communication address and receiving, from a party associated with an electronic record having that communication address, a response to the communication, (ii) a postal mailing automatically generated by a distribution center, (iii) a postal mailing received by the distribution center, (iv) an email automatically generated by an email server, (v) information provided a web interface, (vi) an interactive voice response system associated with a telephone call center, (vii) a chat application that interacts with a party in real time, and (viii) a video link.

11. The system of claim 1, wherein the performance outcomes are associated with at least one of: (i) manual underwriting decisions, (ii) a direct notice of cancellation, (iii) a do not renew decision, (iv) endorsement activity, and (v) a level of verifiability.

12. A method to automatically identify electronic records to be routed to a supplemental insurance review process, the method performed via at least one processor and a non-tangible, computer-readable medium storing programmed instructions in an application computer server, the method comprising:
extracting indeterminate historical data from raw files;
storing, in a data store, the indeterminate historical data, determinate historical data originating from determinate data sources, and a batch of electronic records representing a potential new risk association with an entity, wherein each record in the batch of electronic records contains a record identifier and a set of record characteristic values including at least:
one record characteristic value representing a characteristic of the entity,
one record characteristic value representing an original source of the each record, and
one record characteristic value representing third-party data;
training a plurality of independent analytics decision making models using the stored indeterminate and determinate historical data, wherein the plurality of trained independent analytics decision making models apply statistical techniques including at least machine learning, and wherein at least one of the plurality of independent analytics decision making models is associated with a probability, p, of an electronic record representing a potential new risk undergoing a supplemental review process defined as:

$$p = \ln\left(\frac{p}{1-p}\right) = \beta_0 + \beta_1 x_1 + \ldots + \beta_p x_p,$$

wherein $\beta_i$ are weighing values and $x_i$ are associated with the record characteristic values;
applying the plurality of independent analytics decision making models to the each record and its corresponding set of record characteristic values;
combining, by a data fusion component, output from the plurality of independent analytics decision making models based on a priority assigned to each model;
determining, based upon the combined output of the data fusion component, a score value associated with the each record;
generating a ranked list of the score values associated with the each record beginning with those representing a potential new risk association most likely to benefit from the supplemental review process and ending with those least likely to benefit from the supplemental review process;
transmitting the ranked list to an interactive user interface display via a communication port coupled to the back-end application computer server and the data store;
automatically routing the each record in the ranked list having a score value above a pre-determined threshold to a remote administrator computer to undergo the supplemental review process;
monitoring performance outcomes including at least one of risk profitability, risk quality and policy growth for the potential new risk association represented by the batch of electronic records to which the plurality of independent analytics decision making models were applied;
reanalyzing the performance outcomes, the historical data, and the ranked list of score values associated with the each record identified for supplemental review to measure the accuracy of each of the trained independent analytics decision making models; and
fine tuning the independent analytics decision making models and the data fusion component to improve the accuracy of identifying records for supplemental review.

13. The method of claim 12, wherein each entity is associated with a potential insured and the potential new risk association is a potential new insurance policy and the supplemental review process comprises an underwriting evaluation of the potential new insurance policy.

14. A non-tangible, computer-readable medium of an automated back-end application computer server, the medium storing instructions that, when executed by the server, cause the processor to perform a method to automatically identify electronic records to be routed to a supplemental insurance review process, the method comprising:
extracting indeterminate historical data from raw files;
storing, in a data store, the indeterminate historical data, determinate historical data originating from determinate data sources, and a batch of electronic records representing a potential new risk association with an entity, wherein each record in the batch of electronic records contains a record identifier and a set of record characteristic values including at least:
one record characteristic value representing a characteristic of the entity,
one record characteristic value representing an original source of the each record, and
one record characteristic value representing third-party data;
training a plurality of independent analytics decision making models using the stored indeterminate and determinate historical data, wherein the plurality of trained independent analytics decision making models apply statistical techniques including at least machine learning, and wherein at least one of the plurality of independent analytics decision making models is associated with a probability, p, of an electronic record representing a potential new risk undergoing a supplemental review process defined as:

$$p = \ln\left(\frac{p}{1-p}\right) = \beta_0 + \beta_1 x_1 + \ldots + \beta_p x_p,$$

wherein $\beta_i$ are weighing values and $x_i$ are associated with the record characteristic values;
applying the plurality of independent analytics decision making models to the each record and its corresponding set of record characteristic values;
combining, by a data fusion component, output from the plurality of independent analytics decision making models based on a priority assigned to each model;
determining, based upon the combined output of the data fusion component, a score value associated with the each record;
generating a ranked list of the score values associated with the each record beginning with those representing a potential new risk association most likely to benefit from the supplemental review process and ending with those least likely to benefit from the supplemental review process;

transmitting the ranked list to an interactive user interface display via a communication port coupled to the back-end application computer server and the data store;

automatically routing the each record in the ranked list having a score value above a pre-determined threshold to a remote administrator computer to undergo the supplemental review process;

monitoring performance outcomes including at least one of risk profitability, risk quality and policy growth for the potential new risk association represented by the batch of electronic records to which the plurality of independent analytics decision making models were applied;

reanalyzing the performance outcomes, the historical data, and the ranked list of score values associated with the each record identified for supplemental review to measure the accuracy of each of the trained independent analytics decision making models; and fine tuning the independent analytics decision making models and the data fusion component to improve the accuracy of identifying records for supplemental review.

15. The medium of claim 14, wherein each entity is associated with a potential insured and the potential new risk association is a potential new insurance policy and the supplemental review process comprises an underwriting evaluation of the potential new insurance policy.

\* \* \* \* \*

UNITED STATES PATENT AND TRADEMARK OFFICE
CERTIFICATE OF CORRECTION

PATENT NO. : 10,706,474 B2  
APPLICATION NO. : 15/137667  
DATED : July 7, 2020  
INVENTOR(S) : Kimberly A. Rieth, Lucas Raymond Roberts and Christopher L. Sheaffer Page 1 of 1

It is certified that error appears in the above-identified patent and that said Letters Patent is hereby corrected as shown below:

In the Claims

Claim 7, Column 18, Line 36, after the word "rate", "(v" should be "vii)".

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*